United States Patent
Bryant

(10) Patent No.: US 12,458,007 B1
(45) Date of Patent: Nov. 4, 2025

(54) FISHING LURE WITH INVERTED BILL

(71) Applicant: Kevin Bryant, Dallas, TX (US)

(72) Inventor: Kevin Bryant, Dallas, TX (US)

(*) Notice: Subject to any disclaimer, the term of this patent is extended or adjusted under 35 U.S.C. 154(b) by 255 days.

(21) Appl. No.: 17/208,443

(22) Filed: Mar. 22, 2021

(51) Int. Cl.
A01K 85/02 (2006.01)
A01K 85/00 (2006.01)

(52) U.S. Cl.
CPC .......... A01K 85/1803 (2022.02); A01K 85/02 (2013.01); A01K 85/1813 (2022.02); A01K 85/1831 (2022.02); A01K 85/1851 (2022.02)

(58) Field of Classification Search
CPC .... A01K 85/02; A01K 85/021; A01K 85/023; A01K 85/1813; A01K 85/022; A01K 85/024; A01K 85/1803; A01K 85/1811; A01K 85/1821; A01K 85/1823; A01K 85/1827; A01K 85/1831; A01K 85/1833; A01K 85/16; A01K 85/1851; A01K 85/1837
USPC ................. 43/42.36, 35, 42.47, 42.28, 42.26
See application file for complete search history.

(56) References Cited

U.S. PATENT DOCUMENTS

| | | | | |
|---|---|---|---|---|
| 1,333,154 A | * | 3/1920 | Buddle | A01K 85/02 43/42.43 |
| 1,644,151 A | | 10/1927 | Rodgers | |
| 2,025,270 A | * | 12/1935 | Chaney | A01K 85/16 43/42.47 |
| 2,360,563 A | * | 10/1944 | Harman | A01K 85/16 43/42.47 |
| 2,523,949 A | * | 9/1950 | Gambill | A01K 85/16 43/42.4 |
| 2,604,718 A | * | 7/1952 | Crumb | A01K 85/16 43/42.47 |
| 2,608,016 A | | 8/1952 | Shipley | |
| 2,644,265 A | | 7/1953 | Stettner | |
| 2,685,145 A | | 8/1954 | Dean | |
| 2,760,294 A | | 8/1956 | Morrill | |
| 2,775,839 A | | 1/1957 | Kuslich | |
| 2,927,392 A | * | 3/1960 | Lievense | A01K 85/00 D22/127 |
| 3,344,549 A | * | 10/1967 | Peters | A01K 85/00 D22/127 |
| 3,349,513 A | | 10/1967 | Jeff | |
| 3,490,165 A | * | 1/1970 | Thomassin | A01K 85/18 43/42.22 |
| 3,738,046 A | * | 6/1973 | Johnson | A01K 85/16 43/42.47 |
| 3,750,321 A | * | 8/1973 | McClellan | A01K 85/00 43/42.32 |
| 4,098,017 A | | 7/1978 | Hall | |
| 4,141,171 A | * | 2/1979 | Muddiman | A01K 85/16 43/42.47 |

(Continued)

FOREIGN PATENT DOCUMENTS

CA 2581690 C 9/2008
FR 2972326 B1 3/2014

(Continued)

Primary Examiner — Darren W Ark
Assistant Examiner — Sahar Almatrahi
(74) Attorney, Agent, or Firm — James E. Walton

(57) ABSTRACT

A fishing lure includes a hook assembly and a body assembly. The hook assembly includes a hook, an inverted bill coupled to the hook, and an eyelet coupled to an underneath surface of the inverted bill. The body assembly is coupled to the hook assembly.

12 Claims, 4 Drawing Sheets

(56) References Cited

U.S. PATENT DOCUMENTS

| | | | |
|---|---|---|---|
| 4,712,326 A * | 12/1987 | Hoover | A01K 85/01 43/42.31 |
| 4,713,907 A * | 12/1987 | Dudeck | A01K 85/00 43/42.39 |
| 4,738,047 A | 4/1988 | Ryan | |
| 4,771,567 A * | 9/1988 | Cannon | A01K 85/00 43/42.26 |
| 4,791,749 A * | 12/1988 | Stazo | A01K 85/00 43/42.39 |
| 5,115,592 A | 5/1992 | Renaud | |
| 5,119,581 A * | 6/1992 | Rudolph | A01K 85/16 43/42.22 |
| 5,129,176 A * | 7/1992 | Gudermuth, Jr. | A01K 85/14 43/42.4 |
| 5,157,859 A * | 10/1992 | Wirkus | A01K 85/00 43/42.39 |
| 5,216,830 A | 6/1993 | Brott | |
| 5,228,230 A * | 7/1993 | Vaught | A01K 85/00 43/42.26 |
| 5,339,559 A * | 8/1994 | Strobbe | A01K 85/00 43/44.8 |
| 5,490,347 A * | 2/1996 | Conley | A01K 85/16 43/42.47 |
| 5,491,927 A * | 2/1996 | Ortiz | A01K 85/00 43/42.39 |
| 5,524,380 A | 6/1996 | Hnizdor | |
| 5,537,770 A | 7/1996 | Storm et al. | |
| 5,566,496 A * | 10/1996 | Rutherford | A01K 85/16 43/42.47 |
| 5,566,498 A | 10/1996 | Itoh | |
| 5,778,593 A | 7/1998 | Baron | |
| 5,784,827 A | 7/1998 | Jimenez, Jr. et al. | |
| 5,899,015 A * | 5/1999 | Link | A01K 85/00 43/42.39 |
| 5,915,944 A | 6/1999 | Strunk | |
| 5,937,569 A * | 8/1999 | Solheim | A01K 85/16 43/42.49 |
| 6,082,039 A | 7/2000 | McGuinness | |
| 6,141,900 A * | 11/2000 | Rudolph | A01K 85/00 43/42.31 |
| 6,460,286 B1 | 10/2002 | Wilson | |
| 6,484,434 B1 | 11/2002 | Elges | |
| 6,516,552 B2 | 2/2003 | Hawkins | |
| 6,546,663 B1 | 4/2003 | Signitzer et al. | |
| 6,772,553 B2 * | 8/2004 | Phillips | A01K 85/02 43/44.8 |
| 6,898,894 B1 * | 5/2005 | Anderson | A01K 85/00 43/42.39 |
| 6,912,808 B1 | 7/2005 | Mak | |
| 7,614,178 B2 * | 11/2009 | Hoyt | A01K 85/01 43/44.8 |
| 7,621,068 B1 * | 11/2009 | Renosky | A01K 85/16 43/42.49 |
| 7,637,050 B2 * | 12/2009 | Brick | A01K 85/00 43/42.35 |
| 7,866,084 B1 * | 1/2011 | Nelson | A01K 85/00 43/42.49 |
| 7,963,066 B2 | 6/2011 | Perrick | |
| 8,028,465 B1 * | 10/2011 | Wuensch | A01K 85/00 43/42.47 |
| 8,713,847 B2 | 5/2014 | Polachek | |
| 8,793,924 B2 | 8/2014 | Hughes | |
| 9,032,661 B2 * | 5/2015 | Cook, Jr. | A01K 85/16 43/42.47 |
| 9,615,552 B2 | 4/2017 | Budd | |
| 10,477,845 B1 * | 11/2019 | Davis | A01K 85/02 |
| 10,729,114 B2 | 8/2020 | St. John | |
| 10,743,527 B2 | 8/2020 | Mancini | |
| 10,842,140 B1 * | 11/2020 | Watson | A01K 85/18 |
| 2001/0045048 A1 | 11/2001 | Johnson | |
| 2002/0050090 A1 | 5/2002 | Lloyd | |
| 2002/0124455 A1 | 9/2002 | Bauman | |
| 2004/0107628 A1 | 6/2004 | Mueller | |
| 2005/0086849 A1 * | 4/2005 | Perrick | A01K 85/00 43/42.47 |
| 2005/0126065 A1 | 6/2005 | Ishii | |
| 2005/0172537 A1 * | 8/2005 | Sampson | A01K 85/16 43/42.39 |
| 2005/0193620 A1 | 9/2005 | King | |
| 2005/0246940 A1 | 11/2005 | Jones et al. | |
| 2006/0010764 A1 | 1/2006 | Frawley et al. | |
| 2006/0107582 A1 * | 5/2006 | Leppala | A01K 85/16 43/42.34 |
| 2006/0254119 A1 | 11/2006 | Siirtola et al. | |
| 2006/0265936 A1 * | 11/2006 | Wilkinson | A01K 85/00 43/42.47 |
| 2007/0101636 A1 | 5/2007 | Dolence et al. | |
| 2007/0107295 A1 * | 5/2007 | Kaptis | A01K 85/16 43/42.22 |
| 2007/0271838 A1 * | 11/2007 | Lowiecki | A01K 85/02 43/17.2 |
| 2008/0236022 A1 | 10/2008 | Harrell | |
| 2008/0250693 A1 * | 10/2008 | Krueger | A01K 85/00 43/42.43 |
| 2008/0271358 A1 | 11/2008 | Meroney | |
| 2009/0064564 A1 * | 3/2009 | Ingram | A01K 85/16 43/42.47 |
| 2009/0211145 A1 * | 8/2009 | Thorne | A01K 85/00 43/43.15 |
| 2010/0101138 A1 * | 4/2010 | Perrick | A01K 85/00 43/42.47 |
| 2010/0126058 A1 | 5/2010 | Hughes | |
| 2010/0223833 A1 | 9/2010 | Rigney | |
| 2010/0236129 A1 * | 9/2010 | Rigney | A01K 85/16 43/42.26 |
| 2012/0023804 A1 | 2/2012 | Hogan | |
| 2013/0247446 A1 | 9/2013 | Coia | |
| 2013/0318857 A1 | 12/2013 | Daniel | |
| 2014/0230310 A1 * | 8/2014 | Nichols | A01K 85/02 43/42.39 |
| 2014/0237889 A1 | 8/2014 | Tamburro | |
| 2015/0007483 A1 | 1/2015 | Thorne | |
| 2015/0128478 A1 * | 5/2015 | Huddleston | A01K 85/02 43/42.39 |
| 2015/0282464 A1 | 10/2015 | Brink | |
| 2016/0330945 A1 | 11/2016 | Mosher | |
| 2017/0215397 A1 * | 8/2017 | Valtanen | A01K 83/02 |
| 2017/0251650 A1 * | 9/2017 | Gierlich | B22D 25/02 |
| 2018/0014517 A1 | 1/2018 | Coletti et al. | |
| 2018/0125047 A1 * | 5/2018 | Gierl | A01K 85/18 |
| 2018/0153147 A1 | 6/2018 | Laabs | |
| 2019/0269114 A1 * | 9/2019 | Biggs | A01K 85/16 |
| 2020/0154688 A1 | 5/2020 | Koppers et al. | |
| 2021/0235677 A1 * | 8/2021 | Choi | A01K 85/00 |

FOREIGN PATENT DOCUMENTS

| | | |
|---|---|---|
| JP | 10108591 A | 4/1998 |
| JP | 10248440 A | 9/1998 |
| JP | 11220976 A | 8/1999 |
| JP | 2001120114 A | 5/2001 |
| JP | 2005058124 A | 3/2005 |
| JP | 2005087156 A | 4/2005 |
| JP | 2005318826 A | 11/2005 |
| JP | 2008148668 A | 7/2008 |
| JP | 2008167692 A | 7/2008 |
| JP | 2010081831 A | 4/2010 |
| JP | 2010154763 A | 7/2010 |
| JP | 2011172500 A | 9/2011 |
| JP | 2012044972 A | 3/2012 |
| JP | 2012143214 A | 8/2012 |
| JP | 2012217350 A | 11/2012 |
| JP | 2012231699 A | 11/2012 |
| JP | 2012231802 A | 11/2012 |
| JP | 2014171467 A | 9/2014 |
| JP | 2015128401 A | 7/2015 |
| JP | 2017023108 A | 2/2017 |
| JP | 2017051144 A | 3/2017 |
| JP | 2017136051 A | 8/2017 |
| JP | 2017184720 A | 10/2017 |
| JP | 3223346 U | 10/2019 |

(56) References Cited

FOREIGN PATENT DOCUMENTS

| | | | |
|---|---|---|---|
| JP | 2020078279 | A | 5/2020 |
| WO | 9742811 | A1 | 11/1997 |
| WO | 9014761 | A1 | 7/2008 |
| WO | 2008081067 | A1 | 7/2008 |

* cited by examiner

FISHING LURE WITH INVERTED BILL

BACKGROUND

1. Field of the Invention

The present application relates to fishing lures. In particular, the present application relates to the location of a hook, bill, and eyelet on a fishing lure.

2. Description of Related Art

Fishing lures have been around for hundreds of years. Some lures are designed to sink, while others are meant to remain suspended in the water or float. Some lures include rigid bills that cause the lure to be driven up or down in the water, depending upon the location and/or configuration of the bill relative to the body of the lure.

Fishing lures often have one or more eyelets attached to them in order to secure fishing line to the lures. Many lures have the eyelet, or eyelets, attached on the body of the lure itself.

Fishing lures typically have one or more hooks coupled to the body of the lure. The locations of hooks vary from lure to lure. Some hooks are rigidly attached to the body of the lure, while other hooks are configured to hang from an eyelet on the body. In some instances, the hooks can be attached to a bill on the lure.

Fishing lures can be designed as a main body that is all one piece. Others are designed in multiple pieces, to cause the lure to perform certain movements during use.

Although great strides have been made in the area of fishing lures, many shortcomings remain.

BRIEF DESCRIPTION OF THE DRAWINGS

The novel features believed characteristic of the present application are set forth in the appended claims. However, the present application itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
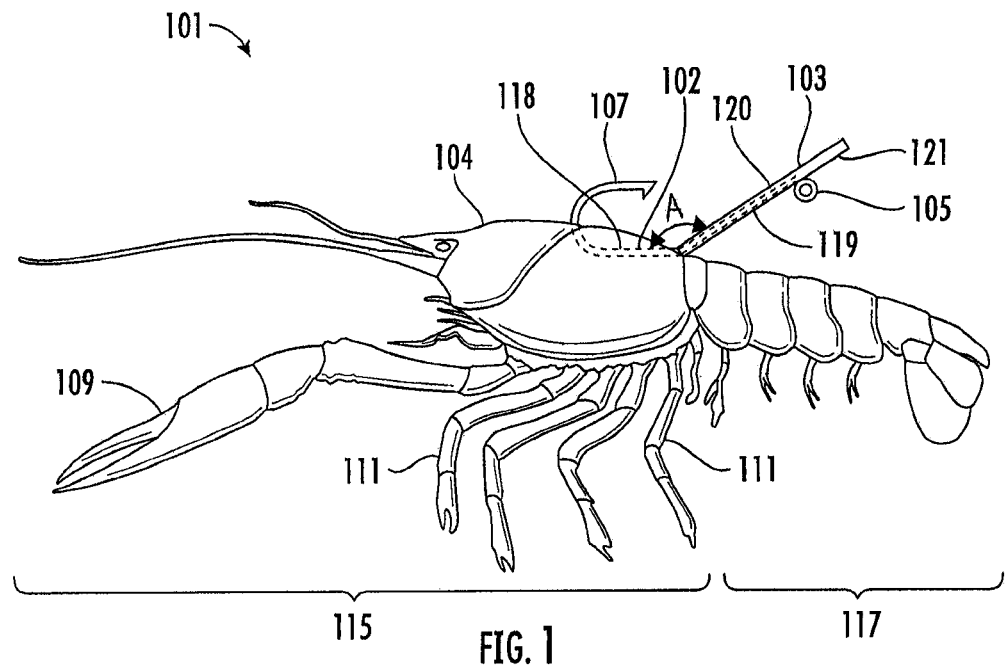
FIG. 1 is a perspective view of a fishing lure with inverted bill according to a preferred embodiment the present application.
Figure 2:
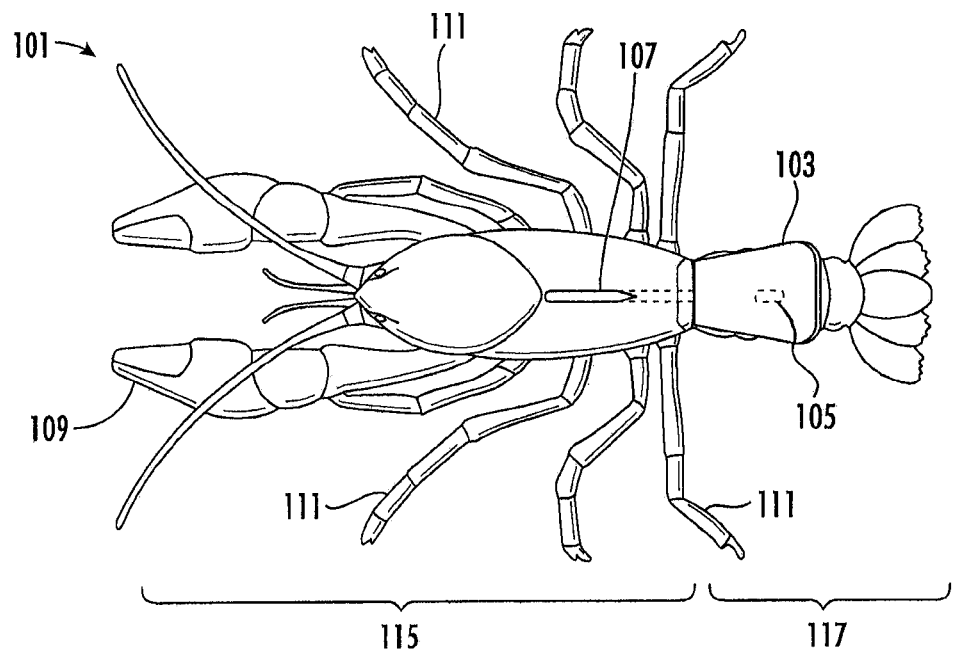
FIG. 2 is a top view of the fishing lure of FIG. 1.

Referring now to FIGS. 1 and 2 in the drawings, a fishing lure with inverted bill according to the preferred embodiment of the present application is illustrated. A fishing lure 101 includes a hook assembly 102 and a body assembly 104. Hook assembly 102 includes a hook 107, an inverted bill 103, and an eyelet 105. Hook 107 includes a barbed hook section, a shaft, and eyelet 105 integral to the end opposite the barbed hook section. In the preferred embodiment, the shaft is bent into two sections, a first shaft section 118 and a second shaft section 120, creating an approximately 135 degree angle, represented by A in FIG. 1. However, it should be appreciated that angle A can be modified to achieve different desired locations of eyelet 105, relative to the barbed hook end of hook assembly 102.

In the preferred embodiment, eyelet 105 meets the upper portion of the shaft at a 90 degree angle, and extends out from the underside of inverted bill 103. However, it should be appreciated that eyelet 105 could extend straight from the end of the shaft, and inverted bill 103 could be molded at an angle, such that eyelet 105 still extends from the underside of inverted bill 103.

Inverted bill 103 includes an upper section 121 and a lower section 119. Upper section 121 and lower section 119 are one solid piece together. In the preferred embodiment, eyelet 105 is disposed on the underside of inverted bill 103. Eyelet 105 is located between upper section 121 and lower section 119 of the underside of inverted bill 103. It is preferred that upper section 121 is approximately thirty percent of the length of inverted bill 103 and lower section 119 is approximately seventy percent of the length of inverted bill 103. The preferred eyelet 105 location allows a fisherman to better control the movement of fishing lure 101. In the preferred embodiment, eyelet 105 is integral with hook 107. Inverted bill 103 is molded about hook 107 and eyelet 105, creating hook assembly 102. It should be appreciated that hook assembly 102 can also be assembled in other ways. For example, hook 107 and eyelet 105 can be separate pieces, with hook 107 and eyelet 105 being coupled to inverted bill 103 in a variety of ways. If an alternative embodiment is used, hook 107 can either be embedded in inverted bill 103, integral with inverted bill 103, or a portion of inverted bill 103.

In the preferred embodiment, inverted bill 103 is generally planar, having a generally trapezoidal shape, with the narrow end of the trapezoid closer to body assembly 104 and the wide end of the trapezoid further away from body assembly 104. However, it should be appreciated that the shape of inverted bill 103 may be changed, depending on what the desired movement of the lure is. For example, inverted bill 103 could be round, rectangular, triangular, or other shapes. Inverted bill 103 could be lengthened or shortened. Inverted bill 103 could also be made with concave or convex surfaces.

While it is preferred that inverted bill 103 is made of a plastic material, it should be appreciated that inverted bill 103 could be metallic in alternative embodiments. In such embodiments, hook 107 does not have to be integral with eyelet 105. Hook 107 and eyelet 105 could be separate pieces and then be coupled to inverted bill 103 in various ways, such as welding.

In the preferred embodiment, hook assembly 102 is coupled to body assembly 104. Body assembly 104 includes a main body 115 and a tail section 117. In the preferred embodiment, body assembly 104 resembles a crustacean or other shellfish, preferably a crawfish. In this unique configuration of hook assembly 102, a fisherman has better control of fishing lure 101, as the configuration allows for the lure to imitate realistic movement of a crawfish. It should be appreciated that body assembly 104 could be designed to resemble any other desired fishing lure body design.

In the preferred embodiment, main body 115 is made of soft material, such as rubber or silicon, with appendages, such as a leg 111 and a claw 109 that extend from each side of main body 115. By using a soft material, the appendages of main body 115 would be free to move around in a way that realistically imitates a crawfish. Under the preferred embodiment, main body 115 would have eight legs 111 and two claws 109, to best resemble a crawfish. However, it should be appreciated that main body 115 can be designed as one piece, made of hard plastic or other material, having graphical indicia included to give the lure any desired look. Main body 115 is preferred to be solid, but main body 115 could also be hollow or contain an internal attractant component, such as a rattle.

Tail section 117 is coupled to main body 115. In the preferred embodiment, tail section 117 is a hinged, movable tail, designed to function like a crawfish tail when moved in water. However, it should be appreciated that tail section 117 can be designed to look different than a crawfish. Tail section 117 can be coupled to main body 115 in a variety of ways. It should be appreciated that additional hooks, or additional attractant-type components can be added to any location on body assembly 104, if desired.

Figure 3:
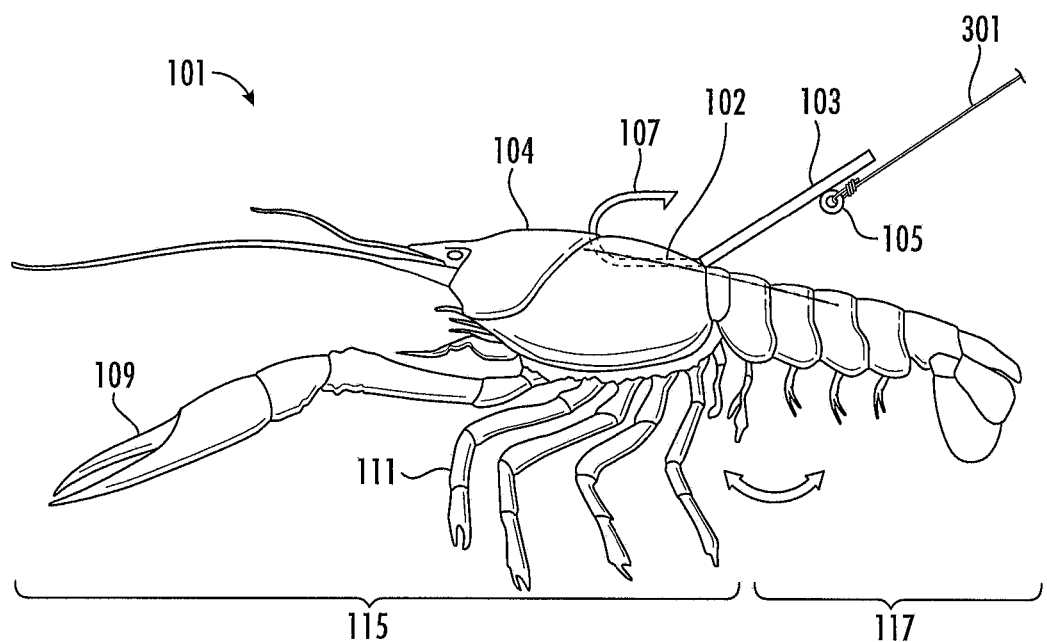
FIG. 3 is a perspective view of the fishing lure of FIG. 1 prior to the lure being pulled upward by a fishing line.
Figure 4:
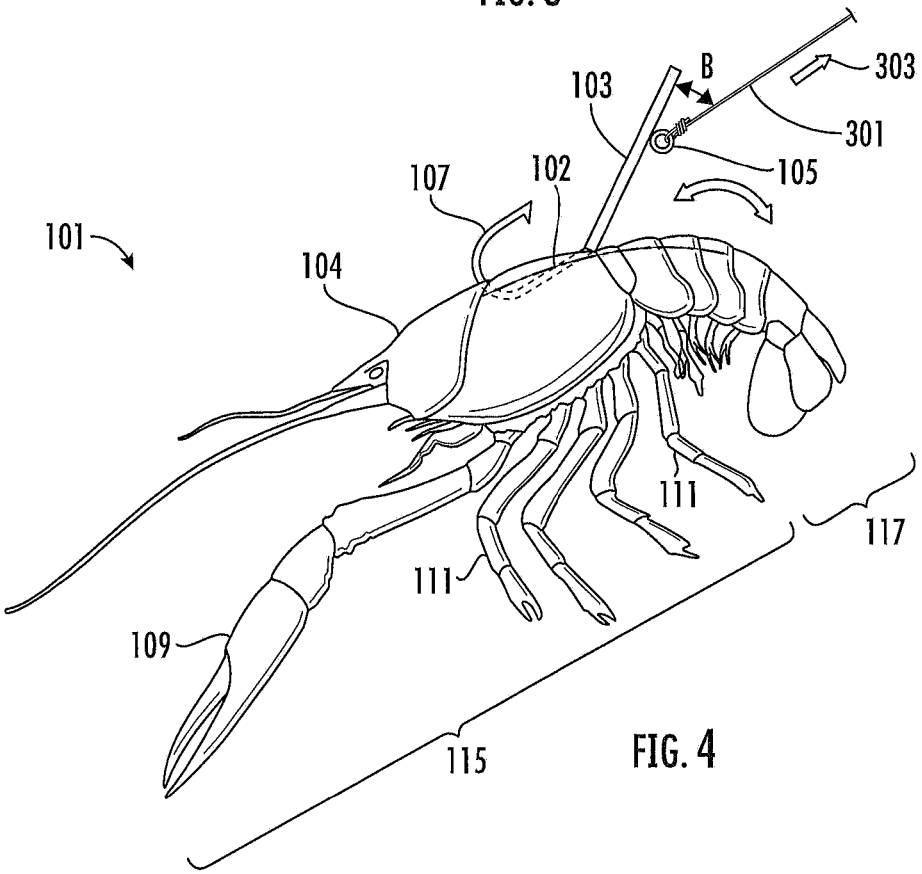
FIG. 4 is a perspective view of the fishing lure of FIG. 1, illustrating a tail section moving downward as a fishing line pulls the lure upward.

Referring now also to FIGS. 3 and 4 in the drawings, fishing lure 101 is again illustrated. A fishing line 301 is shown attached to eyelet 105. FIG. 3 best illustrates the state of fishing lure 101 after the lure has been cast into water, with no action being taken by a fisherman. FIG. 4 best illustrates the same fishing lure 101, but with fishing line 301 being pulled in the direction of an arrow 303. The pulling action creates an angle B between inverted bill 103 and fishing line 301. FIG. 4 best illustrates that when a fisherman pulls fishing line 301 in the direction of arrow 303, tail section 117 bends downward, imitating the action of a crawfish.

It is preferred that fishing lure 101 be made of materials or combinations of materials that allow fishing lure 101 to sink in the water. This is particularly useful when fishing lure 101 takes the form of a crawfish. This lack of buoyancy can be achieved by either using materials that sink in water, or by adding weights to fishing lure 101. The weights may be integral to fishing lure 101, may be attached to fishing lure 101, or may be added to fishing line 301. However, it will be appreciated that in some embodiments it may be desirable that fishing lure be made of materials or combinations of materials that float in water.

Figure 5:
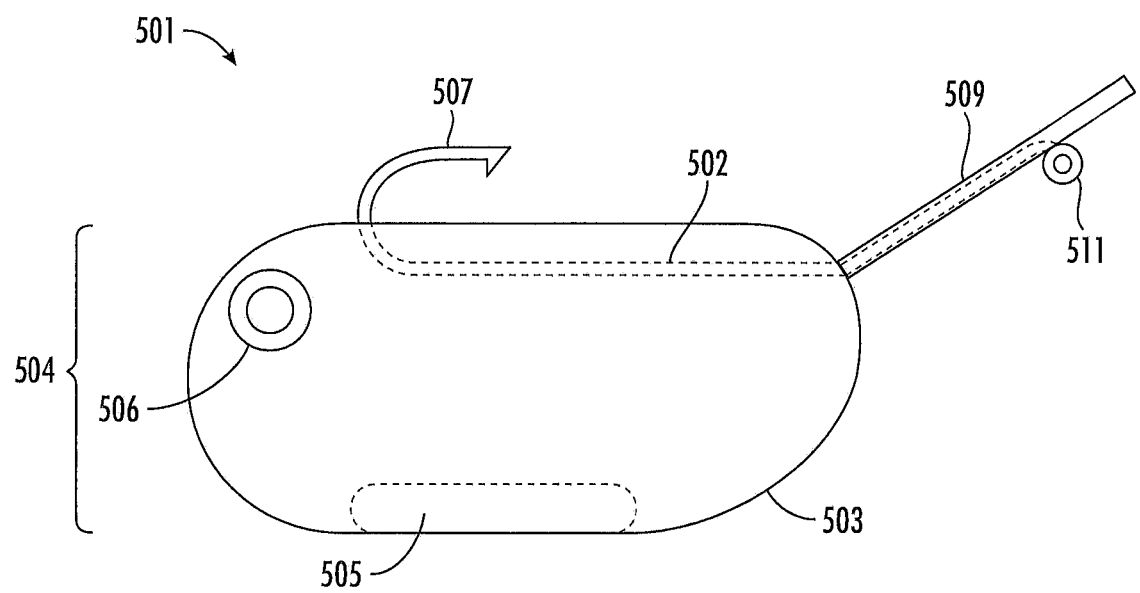
FIG. 5 is a schematic of a fishing lure with inverted bill according to an alternative embodiment of the present application.

Referring now also to FIG. 5 in the drawings, a fishing lure according to an alternative embodiment of the present application is illustrated. Fishing lure 501 includes a hook assembly 502 and a body assembly 504. Hook assembly 502 includes a hook 507, an inverted bill 509, and an eyelet 511. Body assembly 504 includes a rigid body 503 and a weight 505. Weight 505 is located at the bottom portion of rigid body 503. Weight 505 is preferably some type of metal, such as lead or steel, but it should be appreciated that weight 505 could be made of any type of weighted body. It should be appreciated that rigid body 503 can be painted, coated, or otherwise treated to include graphical indicia, such as an eye 506.

Figure 6:
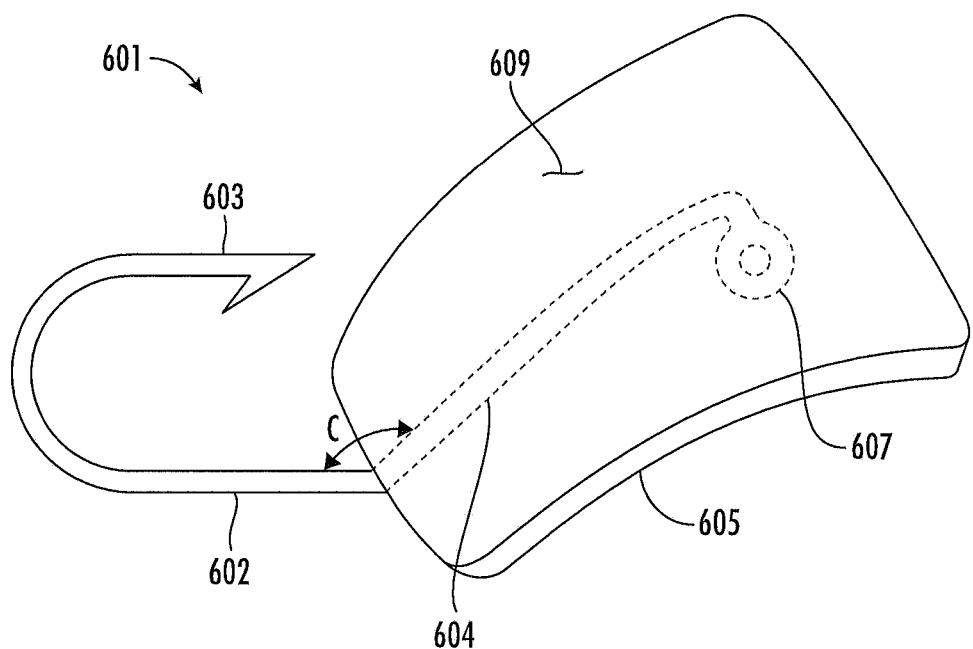
FIG. 6 is a perspective view of a fishing lure with inverted bill according to an alternative embodiment of the present application.
Figure 7:
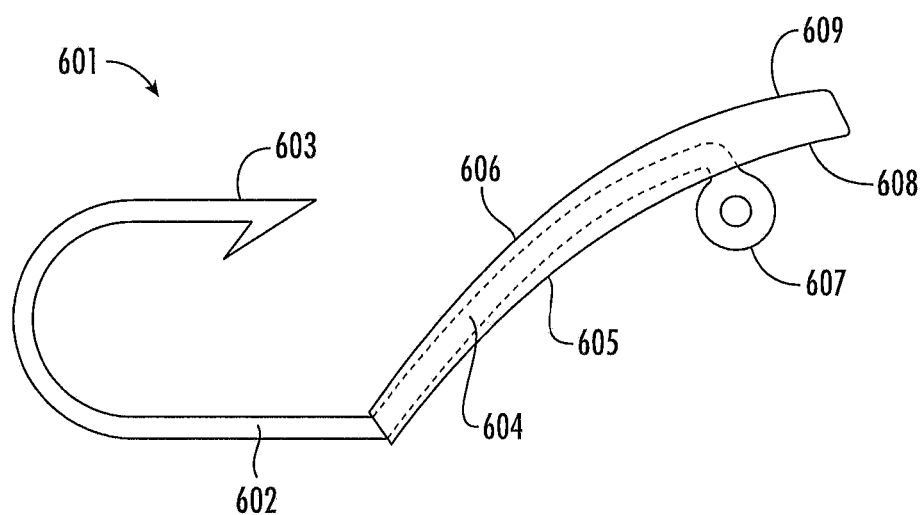
FIG. 7 is a side view of the fishing lure of FIG. 6.

Referring now also to FIGS. 6 and 7 in the drawings, a hook assembly 601 according to an alternative embodiment of the present application is illustrated. A barbed hook 603 is integral with an eyelet 607. A shaft section connects barbed hook 603 with eyelet 607, and is comprised of two parts, a first shaft section 602 and a second shaft section 604. First shaft section 602 and second shaft section 604 meet at a bend, illustrated by angle C.

An inverted bill 605 is molded about barbed hook 603 and eyelet 607. Inverted bill 605 includes an upper section 608 and a lower section 606. Upper section 608 and lower section 606 are one solid piece together. Eyelet 607 extends out from the underside of inverted bill 605. Eyelet 607 is located between upper section 608 and lower section 606.

Hook assembly 601 can be embedded in or coupled to any piece that a fisherman wishes to use as a lure body. Hook assembly 601 may also be used alone as a lure, without connection to any other body. FIG. 6 best illustrates inverted bill 605 having a top surface 609 shaped convexly. The convex top surface 609 can be seen from a side view, illustrated in FIG. 7. It should be appreciated that top surface 609 of inverted bill 605 can be different shapes and sizes, such as making inverted bill 605 circular or creating a concave top surface 609.

It is apparent that an invention with significant advantages has been described and illustrated. Although the present application is shown in a limited number of forms, it is not limited to just these forms, but is amenable to various changes, modifications, and combinations without departing from the spirit thereof.

What is claimed is:

1. A fishing lure, comprising:
    a hook assembly, comprising:
        a one-piece hook, comprising:
            a barbed section;
            a first shaft section connected to the barbed section;
            a second shaft section coupled to the first shaft section; and
            an eyelet extending from an end of the second shaft section; and
        an inverted bill coupled to the hook;
        wherein the inverted bill comprises an upper end and a lower end;
        wherein the first shaft section and the second shaft section intersect at a point of intersection to define a selected angle therebetween;
        wherein the point of intersection is at the lower end of the inverted bill;
        wherein the entirety of the second shaft section extends within the inverted bill;
    and
    wherein the eyelet extends from an underside of the inverted bill; and
    a body assembly coupled to the hook assembly.

2. The fishing lure according to claim 1, wherein the inverted bill is molded about the hook.

3. The fishing lure according to claim 1,
    wherein the eyelet is located at a selected point between the upper end of the inverted bill and the lower end of the inverted bill.

4. The fishing lure according to claim 3, wherein the lower end of the inverted bill is in contact with the body assembly.

5. The fishing lure according to claim 1, wherein the body assembly is formed of a soft material.

6. The fishing lure according to claim 5, wherein the body assembly is in the shape of a crustacean.

7. The fishing lure according to claim 5, wherein the body assembly moves in response to a force applied to the eyelet by a fishing line.

8. The fishing lure according to claim 5, wherein the barbed section extends out from a top of the body assembly.

9. The fishing lure according to claim 1, wherein the body assembly is formed of a rigid material.

10. The fishing lure according to claim 9, further comprising:

graphical indicia on the rigid material to represent a bait.

11. The fishing lure of claim 1, wherein the inverted bill is concave.

12. The fishing lure of claim 1, wherein the inverted bill is convex.

\* \* \* \* \*